Jan. 16, 1968   P. P. JONES   3,363,902
GEOGRAPHICAL GAME INCLUDING MEANS FOR CHECKING CORRECT PLAYS
Filed Jan. 13, 1964   3 Sheets-Sheet 1

INVENTOR.
PROCTOR P. JONES
BY
Fay & Fay
ATTORNEYS

Jan. 16, 1968   P. P. JONES   3,363,902
GEOGRAPHICAL GAME INCLUDING MEANS FOR CHECKING CORRECT PLAYS
Filed Jan. 13, 1964   3 Sheets-Sheet 2

INVENTOR.
PROCTOR P. JONES
BY
Fay & Fay
ATTORNEYS

Jan. 16, 1968   P. P. JONES   3,363,902
GEOGRAPHICAL GAME INCLUDING MEANS FOR CHECKING CORRECT PLAYS
Filed Jan. 13, 1964   3 Sheets-Sheet 3

TYPICAL PLACES SET OF LOCATION PEGS

TYPICAL HISTORICAL SET OF LOCATION PEGS

TYPICAL GEOGRAPHIC SET OF LOCATION PEGS

TYPICAL PRODUCTS SET OF LOCATION PEGS

INVENTOR.
PROCTOR P. JONES
BY
*Fay & Fay*
ATTORNEYS

United States Patent Office 3,363,902
Patented Jan. 16, 1968

3,363,902
GEOGRAPHICAL GAME INCLUDING MEANS
FOR CHECKING CORRECT PLAYS
Proctor P. Jones, 3636 Clay St.,
San Francisco, Calif. 94118
Filed Jan. 13, 1964, Ser. No. 337,395
6 Claims. (Cl. 273—130)

This invention relates to an educational device and more particularly to a geographical game which is educational in that it teaches the participants the location of various subjects such as sites, States, rivers, historical cities, and the like.

Many educational, as well as recreational devices, have been devised in the past with each having as at least an ancillary object the provision of means for testing the knowledge of the participant as to the names and locations of various identifiable subjects. From the standpoint of a tool for education, these prior devices have several major shortcomings. Chief among these has been the limited spectrum of people to which these devices hold appeal. Thus, a game which may be suitable for instructing third or fourth grade pupils in geography is wholly unsuited to the instruction of adults in a similar subject. Another drawback has been the lack of a recreational aspect to the devices heretofore known. Thus, many devices, although adapted for teaching the location of various subjects, do not have any appeal to the participants and interest in the device quickly wanes.

Another shortcoming has been the result of the basic approach in designing the physical characteristics of the game itself. Thus, the vast majority of games or educational devices heretofore designed have provided means whereby some sort of an indicia is to be placed at a particular location on the map or chart. The problem with such an approach, however, is that the student quickly becomes familiar with where a particular color or shape of indicia is to be placed upon the map but wholly fails to grasp the significance of the subject identified by the indicia.

It is an object of this invention to provide an educational device which incorporates recreational and competitive features therein thereby stimulating the interest of the participants in learning the subject sought to be taught by the device.

Another object of this invention is to provide an educational device which may be played by a plurality of participants.

A further object of the invention is the provision of an educational device which may be played by a plurality of persons at various learning levels with each competing against the other as equals.

A further object of the invention is to provide an educational apparatus which is designed to include direct competition among the participants in the game.

A further object of the invention is to provide a game in which each player is to find the location of a plurality of geographic entities on a blank map or chart.

Still another object of this invention is to provide a game in which each player is given a plurality of pegs, each bearing the name of a geographic entity, whereby each peg may be placed in a perforation in a map, which perforations denote the location of the geographic entities.

More specifically, this invention contemplates the provision of an educational device comprising a blank map having a number of perforations passing therethrough, each perforation denoting the location of a geographic entity. A plurality of pegs, each bearing a name of a geographic entity, are adapted to be received in the perforations in the map. Adjacent each perforation on the underside of the map is a number which corresponds to a number of the stem of the peg which is properly placed in that particular perforation. The pegs are designed to include a magnetic retaining means so that the pegs may be retained in the perforations when the board is reversed to inspect the accuracy of the placement of the pegs in the perforations. The pegs are divided into sets of diverse colors so that the pegs of each set may be easily distinguished from the pegs of the other sets. Each set is further subdivided into preferably three subdivisions in accordance with the difficulty in locating the geographic entities called for by the name on each peg. Thus, the pegs in each subdivision of a set have the same basic color but are of different intensity, with the lightest coloring indicating the easiest geographic problems, the intermediate coloring indicating the geographic problems of more difficult character than the first, and the darkest coloring is reserved to the most difficult geographic problems. A competitive element is interjected into the game by providing means whereby the placement of a particular peg by one player may be challenged by another participant in the game. The means for accomplishing this challenge may take various forms which are described in greater detail in the following description.

To the accomplishment of the foregoing and related ends and features, said invention then consists of the means more fully described hereinafter and particularly pointed out in the claims, the following description setting forth in detail but a few of the approved means of carrying out the invention, such disclosed means, however, constituting but a few of the various ways in which the principles of the invention may be used.

In the drawings wherein like reference numerals indicate like parts in the various views.

FIGS. 12–15 inclusive show various kinds of pegs which may be used in connection with the playing of the game.

Figure 1:
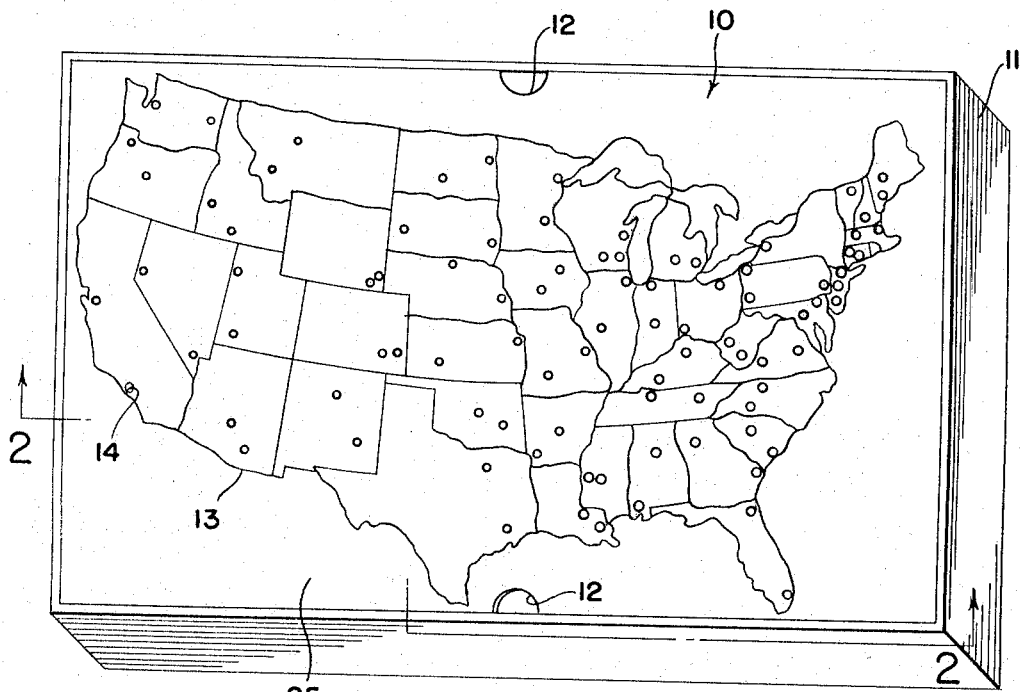
FIG. 1 is a perspective view of the map or chart used in this device.
Figure 2:
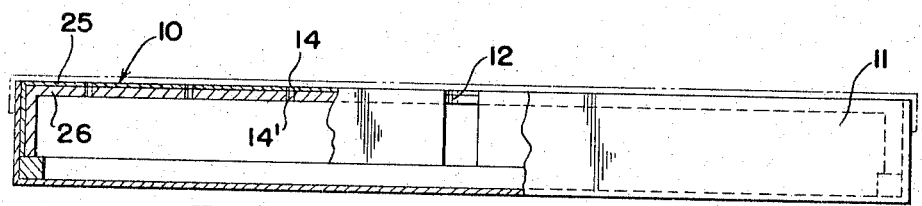
FIG. 2 is a sectional view taken along line 2—2 of FIG. 1.
Figure 3:
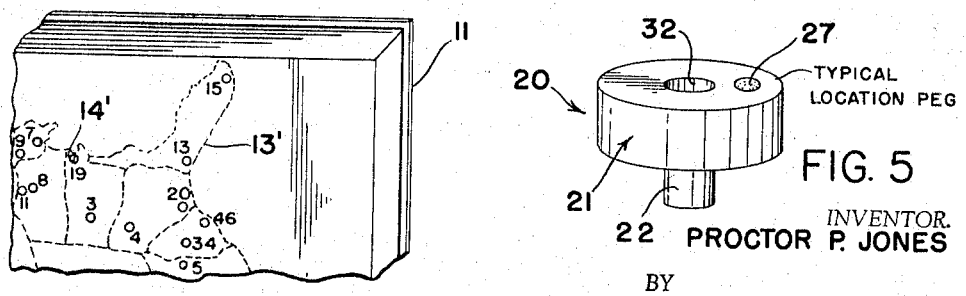
FIG. 3 is a fragmentary view showing the bottom of the map board.
Figure 4:
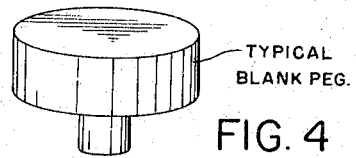
FIG. 4 is a perspective view of a typical blank peg.
Figure 5:
FIG. 5 is a perspective view of a typical location peg.
Figure 6:
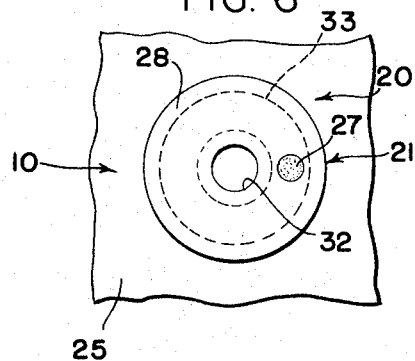
FIG. 6 is a plan view of a peg inserted in a perforation in the map board.

Turning to FIG. 1, there is illustrated one embodiment of the map or chart which may be used in conjunction with the playing of the game. Thus, there is illustrated a rectangular map board, indicated generally by the reference numeral 10, which is supported on a rectangular box 11. The board 10 is removably carried by the supporting box structure 11, with oppositely located indents 12 located on the central transverse cross line of the board for the purpose of facilitating the removal of the board from the box. It is to be emphasized that the illustration of the board 10 and its supporting structure 11 is merely by way of example and many other diverse configurations may be utilized. The structure illustrated in FIG. 1 is merely cited to facilitate and understanding of the basic principles of the invention.

On the top or upper surface of the board 10, there is illustrated a map 13 of the United States. The map may either be formed, printed on or secured to the upper surface of the board. Here again, the illustration of a map of the United States is merely by way of example and it is to be understood that a map or chart of any geographical area may be used. The map 13 preferably shows the natural features of the geographical locations such as mountains, rivers, valleys, lakes, islands, bays, and the like, and also, in the case of the map of the United States, the border lines between the States, cities, and other places of prominence. However, it is to be noted that the map is blank in that none of the geographic entities on the map are named or otherwise identified.

The map 13 is provided with a plurality of perforations 14 which pass through the board 10, with each perforation indicating the location of some geographic entity such as a city, a lake, a mountain, a State, or the like. The underside of the board 10 includes a similar map 13' with the perforations 14' being in the same location on the map on the other side.

Figure 8:
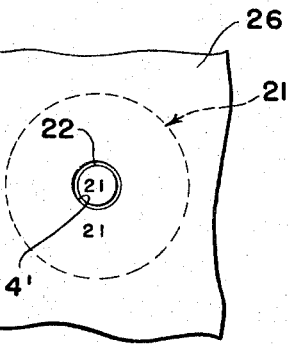
FIG. 8 is a view similar to FIG. 6 showing the indicia on the bottom side of the map board and the end of the location peg.

The game also includes a plurality of pegs, indicated generally by the reference numeral 20. Each of these pegs consists of a cylindrical top portion 21 and a depending cylindrical stem 22 adapted to be received in the perforations 14 in the map. As shown in FIGS. 12–15, the top of the pegs may have inscribed thereon various types of indicia, which would indicate a particular geographic entity. As shown in FIG. 8, the end of each of the stems 22 of the pegs 20 has inscribed thereon a numeral for the purpose of ascertaining the accuracy of the placement of the peg. It is to be understood that the shape of the tops of the pegs may be varied so as to indicate different classes of geographic entities. However, to avoid the possibility that the participant becomes familiar with the location of a particular shape of peg and not the entity symbolized by the peg, I prefer to form each peg in a uniform cylindrical shape.

It is contemplated that a plurality of sets of pegs 20 will be provided with each game so that several persons may be included in the game. Each set of pegs has a different color than the other sets so as to maintain a distinction between the pegs of each participant. The pegs in any one set are further subdivided into preferably three subdivisions in accordance with the difficulty in locating the geographic entities called for by the name on each peg. Thus, the pegs in each subdivision of a set have the same basic color but are of different intensity with the lightest coloring indicating the easiest geographic problems, the intermediate coloring indicating the geographic problems of more difficult character than the first and the darkest coloring is reserved to the most difficult problems.

Adjacent each perforation on the underside of the board, there is a numeral which corresponds to the numeral on the end of the stem 22 of one of the pegs 20. Thus, if the peg 21 is inserted in the proper perforation, the numeral 21 will appear on the end of the stem so that when the map is viewed from the underside, a pair of numerals 21 should appear adjacent one another as shown, for example, in FIG. 8.

Figure 7:
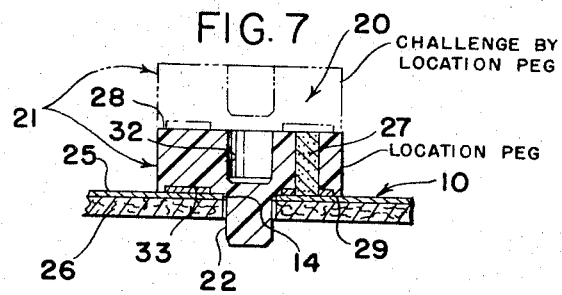
FIG. 7 is a side elevation view in section showing the challenging of a location peg.

The board 10 may be constructed of various materials. However, as shown in FIG. 7, the board includes a thin metal sheet 25 which, in the embodiment of FIG. 7, is secured to a supporting nonmetallic sheet 26. As a means for retaining the pegs 20 in the perforations 14, there is provided in the embodiment of the pegs illustrated in FIG. 7 a small magnet 27 which is in the form of a cylinder and extends between the upper and lower surfaces 28, 29 respectively of the top 21 of the peg 20. It is believed apparent from an inspection of FIG. 7 that the magnet 27 serves to retain the peg 20 in the perforation 14 due to the attraction of the metallic sheet 25 to the magnet 27.

The provision of a magnet such as that shown in the embodiment of FIG. 7 is important in that is permits considerable simplification of the device. Thus, by the provision of numerals on the ends of the stems 22 of the pegs 20 which correspond with numerals placed adjacent the perforations on the underside of the board, there is provided a quick and indisputable system of vertifying the accuracy with which the pegs have been placed on the board 10. However, to inspect the proper placement of the pegs, it is necessary to view the underside of the board 10 and without the provision of a means for retaining the pegs in the perforations, the pegs would have a tendency to be displaced from the perforations before an inspection of the pegs could be made. The provision of a magnet in the manner shown retains the pegs in the perforations during the inspection of the reverse side of the board.

Figure 10:
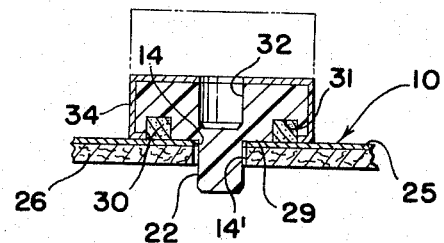
FIG. 10 illustrates a modified construction of the location peg.

The magnet may take other forms than that shown in FIG. 7, as, for example, shown in FIG. 10. In the embodiment of FIG. 10, the magnet 30 is in the form of a ring which is embedded in an annular recess 31 in the lower surface 29 of the top of the peg 20. Still other forms will suggest themselves to those having ordinary skill in the art and the precise configuration of the magnet is not meant to be controlling.

Each of the pegs illustrated in FIGS. 7 and 10 includes a recess 32 of a diameter adapted to receive the stem of another peg whereby one peg may be placed on top of another, as illustrated in FIG. 7, for a purpose hereinafter disclosed. To provide means for retaining a peg with its stem 22 in the recess 32, a circular metallic ring 33 on the lower surface 29 of the peg may be provided which is adapted to cooperate with the magnet 27. An alternative means for retaining the peg in position on top of the other peg is illustrated in FIG. 10 wherein the entire upper surface of the peg is encased in a metal sheet 34 which would cooperate with the magnet 30 in the upper peg and thereby secure the upper peg to the lower peg. It is believed obvious that other combinations of designs may be utilized and those illustrated in FIG. 7 and FIG. 10 are merely by way of example.

Figure 11:
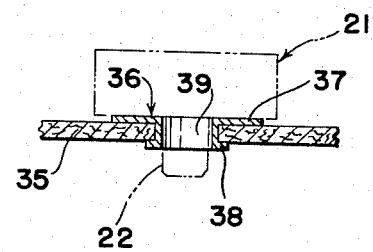
FIG. 11 is a modification of the map board.
Figure 12:
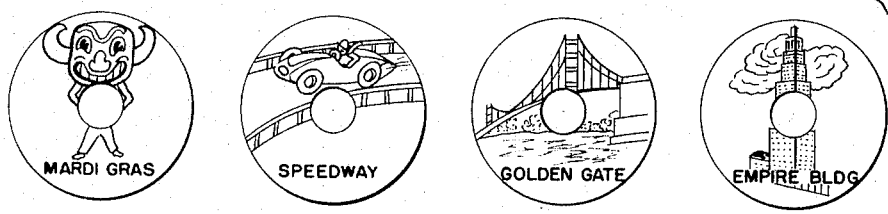
Figure 13:
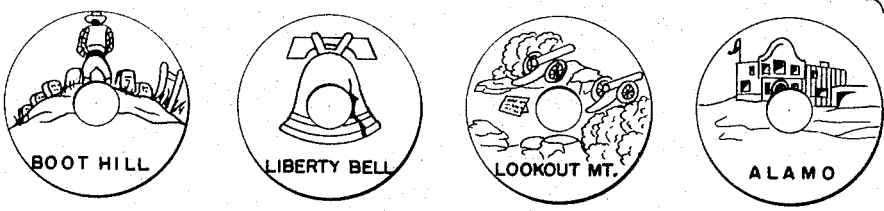
Figure 14:
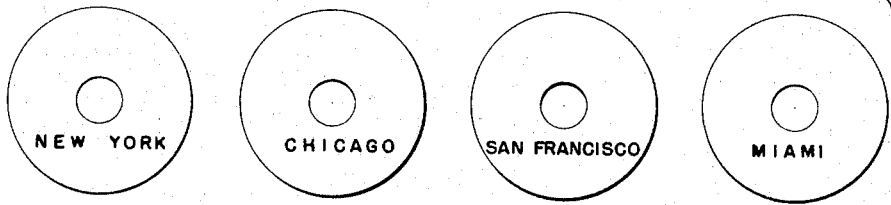
Figure 15:
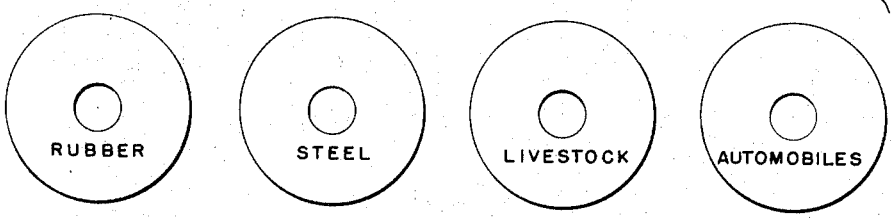

FIG. 11 illustrates a modified board wherein the board comprises a nonmetallic board 35 which has apertures larger in diameter than the apertures 14 in the boards heretofore described. Received in these apertures is a metallic insert 36 which is adapted to be secured in the aperture in the board 35, with the insert being retained in the aperture due to the clamping of the board 35 between the upper and lower surfaces 37, 38 respectively of the insert. The insert 36 includes a passage 39 therethrough which is approximately equal in diameter to the perforations 14 hereinbefore described so that a stem 22 of a peg may be received in the insert. The insert is of a metallic composition so that the magnets in the pegs previously described are attracted to the insert and thereby retain the pegs in position on the board.

The game may be played as follows: Each player is assigned a particular group of pegs of one color. Keeping in mind that each group of pegs is further subdivided into groupings of pegs having different intensity of the basic color, the players may agree between themselves as to which subdivision of the basic color any one particular player may use. By this method, assuming the lightest intensity coloring indicates the easiest geographic problems, the participant who is inferior in age or knowledge may be placed on an equal footing with those in a superior position. Once each player has been assigned a basic color peg and the particular subdivision of the color that will be played, the first player proceeds to select a peg and insert the peg in a perforation 14 on the board 10 which, in the estimate of the player, denotes the location of the geographic entity named on the top of the peg. Thereafter, the rest of the players, one after another, select a peg and place them on the board as above described.

Figure 9:
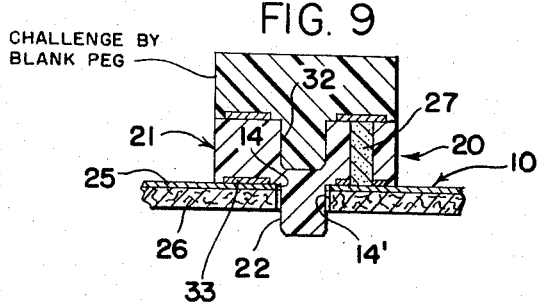
FIG. 9 is a view similar to FIG. 7 showing the challenge by a blank peg.

If, in the estimation of one of the players, another player has erroneously placed a peg in a perforation in the board, the other player may challenge the accuracy of the placement of the peg. This is accomplished by one of two ways. If the challenging player has a location peg which has what he considers the proper name for the geographic entity, he may take that peg and insert its stem 22 in the recess 32 in the top of the previously placed location peg. Such a challenge is illustrated in FIG. 7. It may be that still another player may feel that the challenging peg is erroneously placed and he, in turn, may challenge by placing another location peg on top of the challenging location peg. This may continue so long as someone feels that the geographic entity has been erroneously identified. If the first player to challenge does not have a peg which he considers to be the proper name of the geographic entity which was erroneously identified, he may select a blank peg which is colored in accordance with his particular color grouping of pegs and challenge by placing this blank peg with its stem 22 in the recess 32 of the previously located peg. With this challenge, further challenges are not permitted. This type of challenge by using a blank peg is illustrated in FIG. 9. Other types of blank challenging means may be utilized as, for example, a simple metallic disk which, when placed on top of the previously located peg, would be attracted to the magnet 27 and would thereby be retained in position.

After each player has exhausted his supply of pegs, the board is inverted and the accuracy of each located peg is checked. This is accomplished by a comparison of the numeral on the end of the stem 22 of each peg and the numeral on the bottom of the board adjacent the perforation in which the peg is inserted. Thus, for example as shown in FIG. 8, the peg 21 is properly located in the perforation identified by the numeral 21. Various types of scoring systems may be devised whereby the player with the most pegs accurately located would be judged the winner.

Several features are to be emphasized in the above-described device. Foremost among these is the provision of a simple yet effective means whereby a participant may acquaint himself with the identity of certain locations on a map or chart. A competitive element has been introduced in this educational device in that one participant may challenge the location identified by another participant. Moreover, the game provides means whereby the participants may compete on an equal footing. Finally, there is provided a simple method whereby the accuracy of the participants may be ascertained and means have been devised whereby this simple method may be effectively utilized.

For purposes of description, the principles of the invention have been set forth in connection with but a few illustrated embodiments. It is not my intention that the illustrated embodiments nor the terminology employed in describing them be limiting inasmuch as variations in these may be made without departing from the spirit of the invention, but rather, it is my desire to be restricted only by the scope of the appended claims.

I claim:

1. An educational device comprising a board having a blank geographical map on the upper surface thereof, said board having a plurality of perforations at the points of location of various geographic entities;
a plurality of pegs;
each peg comprising a top and a depending stem insertable in any one of the perforations in said board; the top of each peg including indicia relating to one of said geographic entities thereon;
said pegs being divided into a plurality of sets, with each set having a basic color different from every other set, each set of pegs being further subdivided into the same number of groups of pegs with each group of pegs having a different degree of intensity of the basic color, the degrees of intensity of the colors of the groups of pegs being the same as between sets;
each of said pegs further including a recess in the top thereof with the recess being adapted to receive the stem of another of said pegs whereby one peg may be placed on top of another peg;
means on said pegs mutually cooperable for retaining the pegs on top of each other; and means on said board cooperable with said retaining means on said pegs for retaining said stems in said perforations when said pegs are in a position to fall therefrom;
means for checking the correctness of inserting said pegs in said perforations by glancing on the underside of said board comprising a different symbol on the end of the stem of each peg and corresponding symbols on the underside of the board located near the perforations with the identity of the symbols on the stem and on the board near the perforation indicating the correct insertion of the peg.

2. An educational device comprising a board having a blank geographical map on the upper surface thereof;
said board having a plurality of perforations at the points of location of various geographic entities;
a plurality of pegs;
each peg comprising a top and a depending stem insertable in any one of the perforations in said board; the top of each peg including indicia relating to one of said geographic entities thereon;
said pegs being divided into a plurality of sets with each set having a basic color different from every other set;
each set of pegs being further subdivided into the same number of groups of pegs with each group of pegs having a different degree of intensity of the basic color, the degrees of intensity of the colors of the groups of pegs being the same as between sets;
retaining means on said pegs adapted to cooperate with means on said board for retaining said stems in the perforations of said board when said pegs are in a position to fall therefrom;
each of said pegs further including a recess in the top thereof, the recess being adapted to receive the stem of another of said pegs whereby one peg may be placed on top of another peg;
and means for checking the correctness of inserting said pegs in said perforations by glancing on the underside of said board comprising a different symbol on the end of the stem of each peg and corresponding symbols on the underside of the board located near the perforations with the identity of the symbols on the stem and on the board near the perforation indicating the correct insertion of the peg.

3. An educational device comprising a board having a blank geographical map on the upper surface thereof;
said board having a plurality of perforations at the points of location of various geographical entities;
a plurality of pegs;
each peg comprising a top and a depending stem insertable in any one of the perforations in said board, said pegs being divided into a plurality of sets with each set having a basic color different from every other set;
each set of pegs being further subdivided into the same number of groups of pegs, with each group of pegs having a different degree of intensity of the basic color, the degrees of intensity of the colors of the groups of pegs being the same as between sets;
the top of each peg further including indicia relating to one of said geographic entities thereon;
retaining means on said pegs adapted to cooperate with means on said board for retaining said stems in the perforations of said board when said pegs are in a position to fall therefrom;
and means for checking the correctness of inserting said pegs in said perforation by glancing on the underside of said board comprising a different symbol on the end of the stem of each peg and corresponding symbols on the underside of the board located near the perforations, with the identity of the symbols on the stem and on the board near the perforation indicating the correct insertion of the peg.

4. The device of claim 3 wherein said pegs further include means for challenging the location of a peg in a perforation on the board.

5. The device of claim 4 wherein said means for challenging of claim 4 includes magnetic means adjacent the upper surface of said pegs.

6. The device of claim 4 wherein said means for challenging of claim 4 includes a recess in the top of each of said pegs and magnetic means adjacent the abutting surfaces of said pegs which are mutually cooperable whereby one peg may be placed and held on top of another of said pegs.

References Cited

UNITED STATES PATENTS

| | | | |
|---|---|---|---|
| 1,868,823 | 7/1932 | Goodrich | 35—31.4 |
| 2,008,189 | 7/1935 | Rippon | 273—130 |
| 2,837,836 | 6/1958 | Morawitz. | |
| 2,794,642 | 6/1957 | O'Neill | 273—137 X |
| 2,951,703 | 9/1960 | Arnold | 273—137 |
| 3,171,214 | 3/1965 | Sutherland. | |

F. BARRY SHAY, *Primary Examiner*.